US011704118B2

(12) United States Patent
Price et al.

(10) Patent No.: US 11,704,118 B2
(45) Date of Patent: Jul. 18, 2023

(54) APPLICATION MODERNIZATION

(71) Applicant: International Business Machines Corporation, Armonk, NY (US)

(72) Inventors: Dana L. Price, Surf City, NC (US); Ryan Thomas Claussen, Rochester, MN (US); Vinh Tuan Thai, Markham (CA); Paul Barry, Douglas (IE)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 17/445,468

(22) Filed: Aug. 19, 2021

(65) Prior Publication Data
US 2023/0055088 A1 Feb. 23, 2023

(51) Int. Cl.
*G06F 8/75* (2018.01)
(52) U.S. Cl.
CPC .................... *G06F 8/75* (2013.01)
(58) Field of Classification Search
CPC .............. G06F 8/75; G06F 11/36; G06F 8/20
See application file for complete search history.

(56) References Cited

U.S. PATENT DOCUMENTS

| 7,631,299 | B2 | 12/2009 | Kannenberg |
| 8,782,613 | B2 | 7/2014 | Hines |
| 8,930,919 | B2 | 1/2015 | Bhaskara et al. |
| 10,496,935 | B2 | 12/2019 | Sachdev et al. |

(Continued)

FOREIGN PATENT DOCUMENTS

| CA | 2840437 A1 | 1/2013 |
| CA | 3031056 A1 | 1/2018 |
| FR | 2678406 | 12/1992 |

OTHER PUBLICATIONS

Yale Yu et al., "Enterprise Application Transformation Strategy and Roadmap Design: A Business Value Driven and IT Supportability Based Approach", [Online], pp. 66-71, [Retrieved from Internent on Mar. 25, 2023], <https://ieeexplore.ieee.org/stamp/stamp.jsp?arnumber=6997021>, (Year: 2014).*

(Continued)

*Primary Examiner* — Ziaul A Chowdhury
(74) *Attorney, Agent, or Firm* — Yee & Associates, P.C.

(57) ABSTRACT

A method analyzes applications for modernization. Processor units analyze each application in the applications in isolation from other applications to identify issues in code for the applications and a number of common code components. The processor units create a directed graph structure using the issues identified in the applications and the number of common code components. The directed graph structure includes relationships between the applications, the number of common code components, and the issues identified. The processor units determine a common code component modernization cost for the number of common code components using the directed graph structure. The processor units determine an application modernization cost for a set of the applications using the directed graph structure. The application modernization cost for the set of the applications takes into account the common code component cost for modernizing the number of common code components a single time.

20 Claims, 11 Drawing Sheets

(56) References Cited

U.S. PATENT DOCUMENTS

| | | | |
|---|---|---|---|
| 10,606,573 B2 | 3/2020 | Apte et al. | |
| 10,996,935 B2* | 5/2021 | Jonnadula | G06F 8/447 |
| 11,042,369 B1* | 6/2021 | Kimball | G06F 9/4843 |
| 11,467,828 B1* | 10/2022 | Zhang | H04L 67/34 |
| 2006/0136904 A1* | 6/2006 | Weidman | G06F 8/71 |
| | | | 717/172 |
| 2007/0067756 A1 | 3/2007 | Garza | |
| 2009/0024980 A1 | 1/2009 | Sundararajan et al. | |
| 2010/0042976 A1* | 2/2010 | Hines | G06F 8/72 |
| | | | 717/127 |
| 2010/0114939 A1 | 5/2010 | Schulman et al. | |
| 2014/0297335 A1 | 10/2014 | Wargin et al. | |
| 2016/0092813 A1 | 3/2016 | Baker et al. | |
| 2022/0300280 A1* | 9/2022 | Rafey | G06F 8/77 |

OTHER PUBLICATIONS

CAST, "CAST Highlight—Rapid Application Portfolio Analysis," accessed Aug. 19, 2021, 11 pages. https://www.castsoftware.com/products/highlight.

Mell et al., "The NIST Definition of Cloud Computing," Recommendations of the National Institute of Standards and Technology, Special Publication 800-145, Sep. 2011, 7 pages.

Moore, "7 Options to Modernize Legacy Systems," Gartner, Inc., Dec. 14, 2020, accessed Aug. 19, 2021, 9, pages. "https://www.gartner.com/smarterwithgartner/7-options-to-modernize-legacy-systems/", dated Dec. 14, 2020, accessed on Aug. 19, 2021, 3 pages.

Red Hat, Inc., "Migration toolkit for Applications," accessed Aug. 19, 2021, 6 pages. https://developers.redhat.com/products/mta/overview.

\* cited by examiner

APPLICATION MODERNIZATION

BACKGROUND

1. Field

The disclosure relates generally to computer system and more specifically to modernizing for applications in a computer system.

2. Description of the Related Art

Application modernization is a practice in which older software is updated. This type of modernization can include converting applications to use code written in newer languages, updating software libraries, using newer architectures such as micro services, and employing newer protocols or hardware platforms. A customer may seek to modernize some or all of the applications employed in their organization.

Application modernization includes considering applications as they exist in the current computing environment and identifying a landing zone that is best for the applications. These landing zones can include options such as retire, replace, rewrite, and re-platform one or more applications. In determining the appropriate landing zone for a particular application, application modernization costs can be determined for that application. These costs can include time and expense to perform the application modernization.

SUMMARY

According to one illustrative embodiment, a computer implemented method for analyzing applications for modernization. A number of processor units analyzes each application in the applications in isolation from other applications to identify issues in code for the applications and a number of common code components. The number of processor units creates a directed graph structure using the issues identified in the applications and the number of common code components, wherein the directed graph structure includes relationships between the applications, the number of common code components, and the issues identified. The number of processor units determines a common code component modernization cost for the number of common code components using the directed graph structure. The number of processor units determines an application modernization cost for a set of the applications using the directed graph structure, wherein the application modernization cost for the set of the applications takes into account the common code component cost for modernizing the number of common code components a single time. According to other illustrative embodiments, a computer system and a computer program product for analyzing applications for modernization are provided.

DETAILED DESCRIPTION

Figure 1:
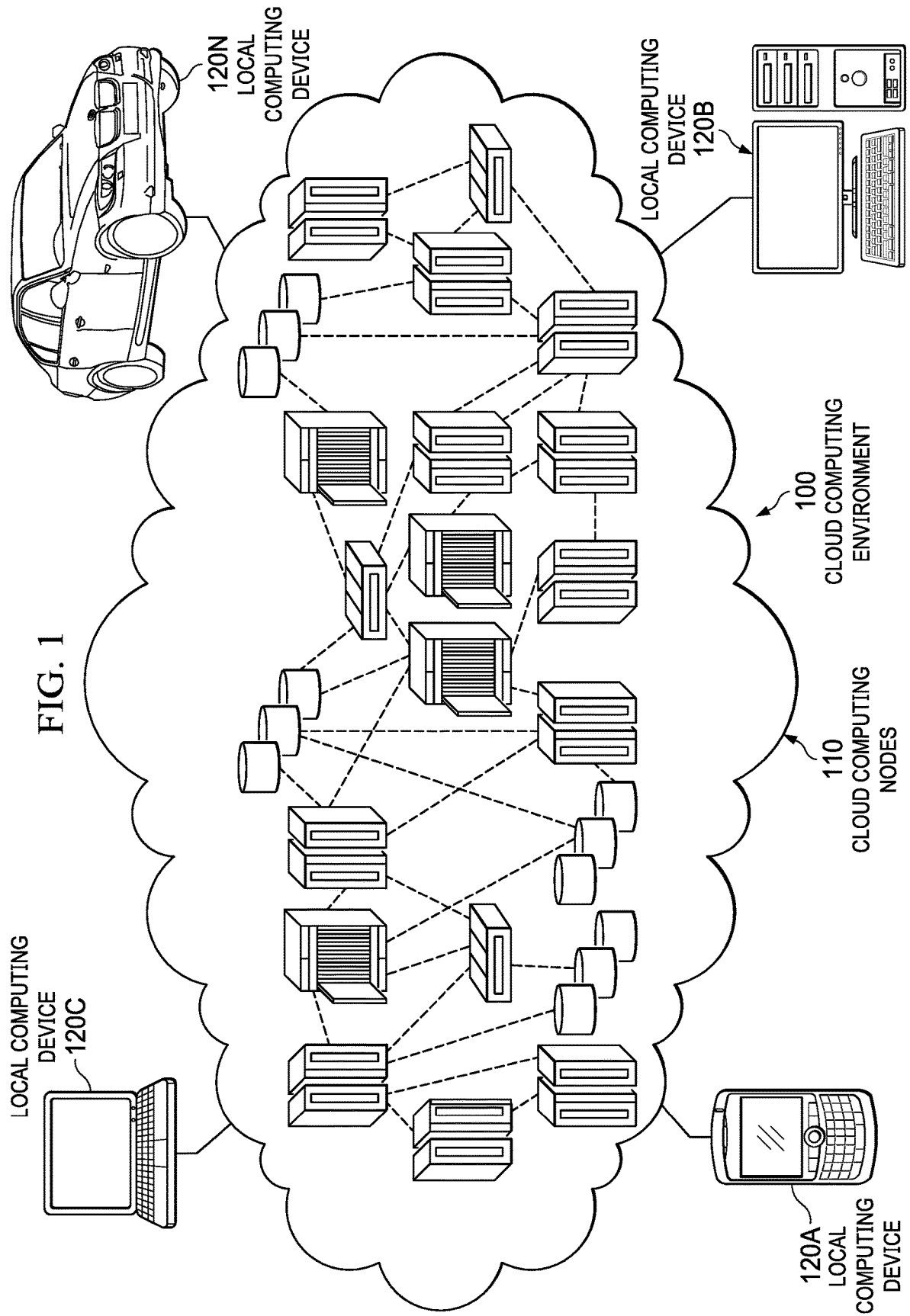
FIG. 1 is a diagram illustrating a cloud computing environment in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account number of different considerations. For example, the illustrative embodiments recognize and take into account that current tools for providing modernization estimates scan a single application in isolation. The illustrative embodiments recognize and take into account that applications do not exist in isolation from each other. For example, the illustrative embodiments recognize and take into account that developers and architects reuse code across different applications. The illustrative embodiments recognize and take into account that important code for applications are often placed in shared code constructs such as libraries. Illustrative embodiments recognize and take into account that shared code constructs provide easy reuse and reduce overall effort in writing new applications and new code. The illustrative embodiments recognize and take into account that examples of common code placed in external libraries include code for logging, monitoring, messaging, and database access.

The illustrative embodiments recognize and take into account that current modernization tools treat instances of shared code as unique and tied directly to the application being evaluated. The illustrative embodiments recognize and take into account that these tools ignore common code and treats each instance of common code as being unique in determining modernization costs, which can include time and expense.

The illustrative embodiments recognize and take into account that current modernization tools overestimate the modernization effort by ignoring common code components and deficiencies that common code provides. Those illustrative embodiments recognize and take into account that as a result, modernization estimates using currently available tools can balloon in size. As result, the illustrative embodiments recognize and take into account that a customer may hesitate or be unwilling to modernize their applications based on the cost.

The illustrative embodiments also recognize and take into account that customer applications are often developed by different groups within an organization. Illustrative embodiments recognize and take into account that this development is often in isolation. As result, illustrative embodiments recognize and take into account that shared code may be present between two applications for two different groups in organization. Illustrative embodiments recognize and take into account that the shared code may at different versions. Illustrative embodiments recognize and take into account that modernizing for shared code between these two different groups can reduce the overall modernization effort for the entire organization.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference now to FIG. 1, a diagram illustrating a cloud computing environment is depicted in which illustrative embodiments may be implemented. In this illustrative example, cloud computing environment 100 includes a set of one or more cloud computing nodes 110 with which local computing devices used by cloud consumers, such as, for example, personal digital assistant or smart phone 120A, desktop computer 120B, laptop computer 120C, and/or automobile computer system 120N, may communicate.

Cloud computing nodes 110 may communicate with one another and may be grouped physically or virtually into one or more networks, such as private, community, public, or hybrid clouds as described hereinabove, or a combination thereof. This allows cloud computing environment 100 to offer infrastructure, platforms, and/or software as services for which a cloud consumer does not need to maintain resources on a local computing device, such as local computing devices 120A-120N. It is understood that the types of local computing devices 120A-120N are intended to be illustrative only and that cloud computing nodes 110 and cloud computing environment 100 can communicate with any type of computerized device over any type of network and/or network addressable connection using a web browser, for example.

Figure 2:
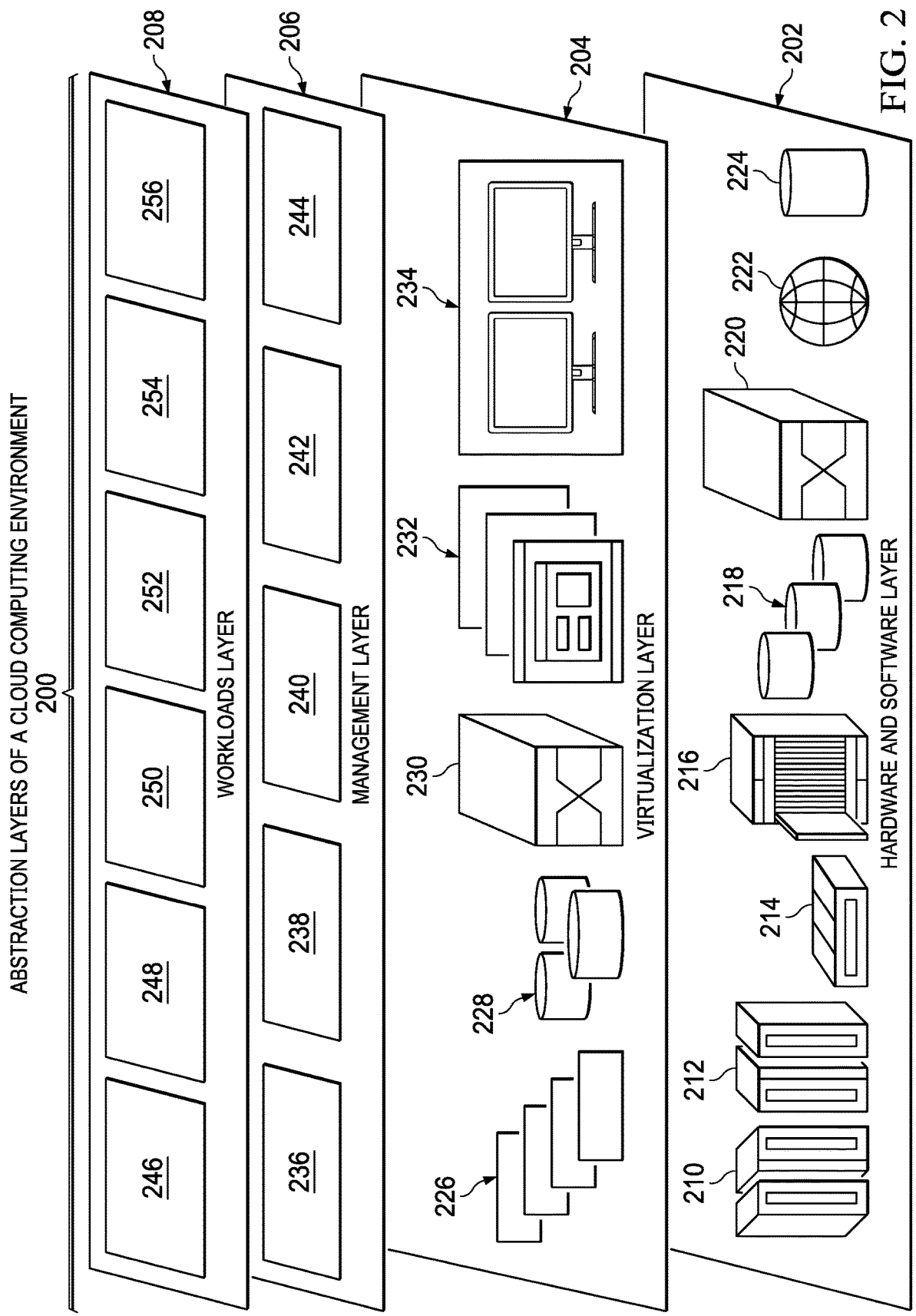
FIG. 2 is a diagram illustrating abstraction model layers in accordance with an illustrative embodiment.

With reference now to FIG. 2, a diagram illustrating abstraction model layers is depicted in accordance with an illustrative embodiment. The set of functional abstraction layers shown in this illustrative example may be provided by a cloud computing environment, such as cloud computing environment 100 in FIG. 1. It should be understood in advance that the components, layers, and functions shown in FIG. 2 are intended to be illustrative only and embodiments of the invention are not limited thereto. As depicted, the following layers and corresponding functions are provided.

Abstraction layers of a cloud computing environment 200 include hardware and software layer 202, virtualization layer 204, management layer 206, and workloads layer 208. Hardware and software layer 202 includes the hardware and software components of the cloud computing environment. The hardware components may include, for example, mainframes 210, RISC (Reduced Instruction Set Computer) architecture-based servers 212, servers 214, blade servers 216, storage devices 218, and networks and networking components 220. In some illustrative embodiments, software components may include, for example, network application server software 222 and database software 224.

Virtualization layer 204 provides an abstraction layer from which the following examples of virtual entities may be provided: virtual servers 226; virtual storage 228; virtual networks 230, including virtual private networks; virtual applications and operating systems 232; and virtual clients 234.

In one example, management layer 206 may provide the functions described below. Resource provisioning 236 provides dynamic procurement of computing resources and other resources, which are utilized to perform tasks within the cloud computing environment. Metering and pricing 238 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 240 provides access to the cloud computing environment for consumers and system administrators. Service level management 242 provides cloud computing resource allocation and management such that required service levels are met. Service level agreement (SLA) planning and fulfillment 244 provides pre-arrangement for, and procurement of, cloud computing resources for which a future requirement is anticipated in accordance with an SLA.

Workloads layer 208 provides examples of functionality for which the cloud computing environment may be utilized. Example workloads and functions, which may be provided by workload layer 208, may include mapping and navigation 246, software development and lifecycle management 248, virtual classroom education delivery 250, data analytics processing 252, transaction processing 254, and application modernization 256.

In this illustrative example, application modernization 256 can operate to modernize applications when moving applications to cloud computing environment 100. This movement of applications can also involve a hybrid cloud environment in cloud computing environment 100. Application modernization 256 can operate to provide more accurate estimates of modernization costs for updating applications for use in cloud computing environment 100 in FIG. 1.

Figure 3:
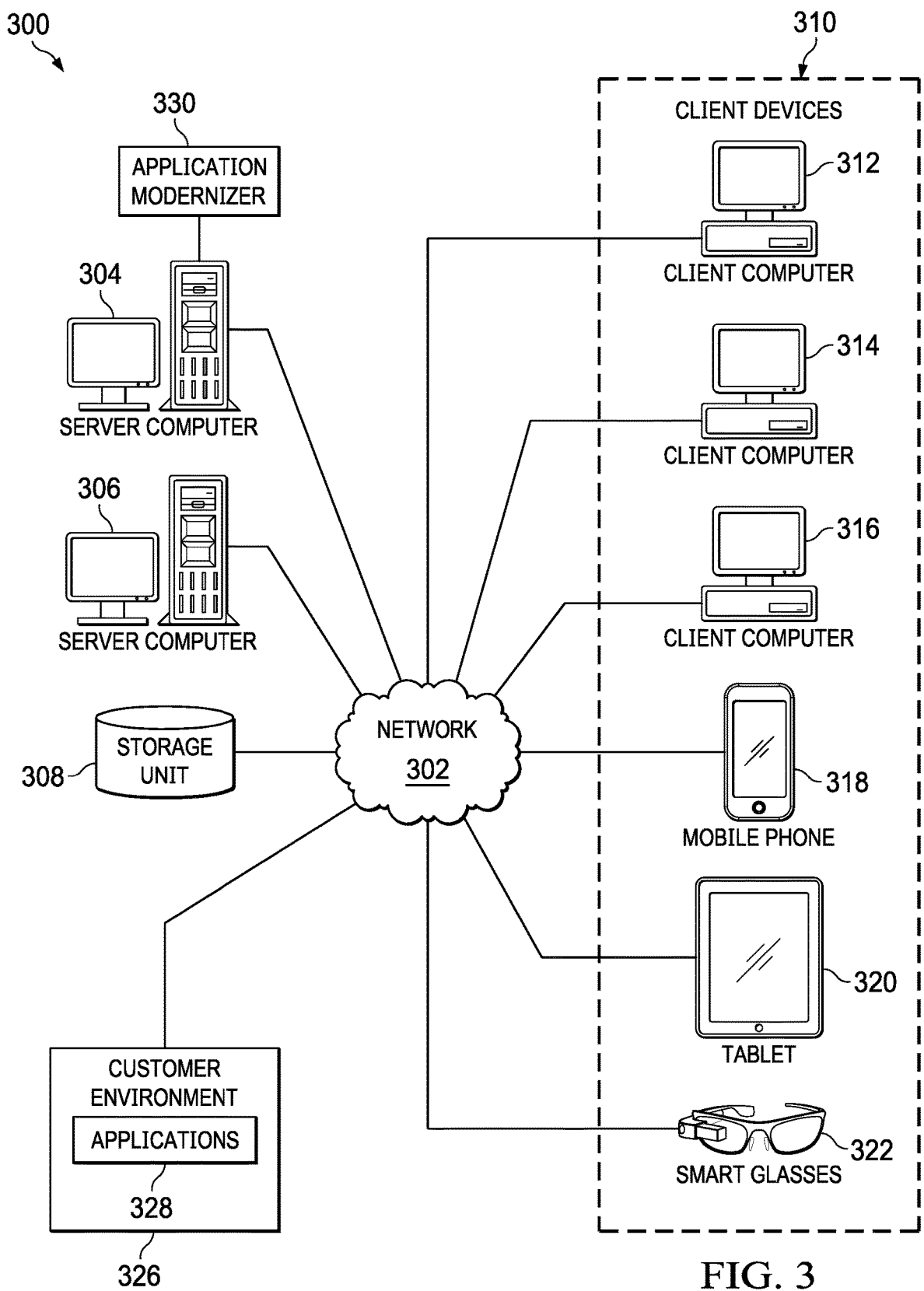
FIG. 3 is a pictorial representation of a network of data processing systems in which illustrative embodiments may be implemented.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wires, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wire, optical fiber, or wireless connection.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, customer environment 326 is an environment in which applications 328 run. Customer environment 326 can be, for example, one or more networks which can be located in one or more physical locations. In this illustrative example, the customer can modernize a number of applications 328 in customer environment 326.

Application modernizer 330 runs on server computer 304. Application modernizer 330 is a tool that determine common code components across applications 328 in customer environment 326. Application modernizer 328 can determine the cost to modernize applications 330. In this illustrative example, the effort for modernize applications 328 takes into account common code components that are present between applications 328. The modernization can include at least one of changing the application to run in a new environment, use a new architecture, or other change that improves the operation of the application. In this illustrative example, the cost can be the time needed to implement the changes. The cost can also include hardware, software, or other resources that may need to be used or purchased.

In this illustrative example, application modernizer 330 can more accurately determine the cost to modernize applications 328 by taking into account that the cost for modernizing a code component that is common were shared between more than one occasion only needs to be taken into account the first time that code component is modernize. This code component that is shared or included in more than one application is referred to as a common code component. As result, application modernizer 330 can avoid overestimating the cost for modernizing applications 328 by identification of common code components used by applications 328 and take into account that a common code components having an issue can have that issue resolved one time with the benefit of the resolution the shared by other applications.

In other words, other applications identified as needing the same code component do not need to take account the resolution for that code component because the code component is a common code with a resolution that has been previously taken into account. Thus, application modernizer 330 can more accurately determine the cost for modernizing applications 328 as compared to currently available tools or techniques.

Figure 4:
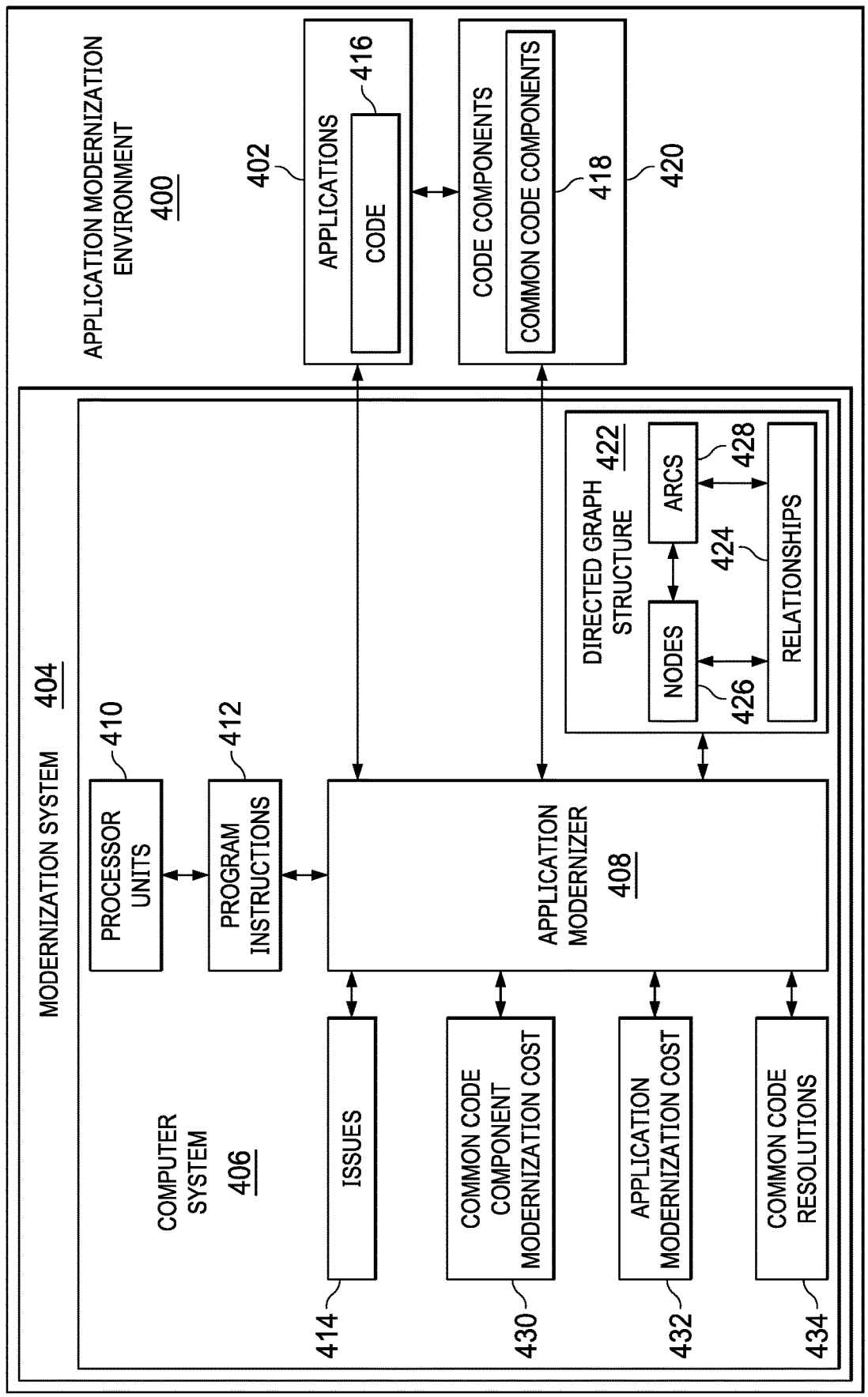
FIG. 4 is a block diagram of an application modernization environment in accordance with an illustrative embodiment.

With reference now to FIG. 4, a block diagram of an application modernization environment is depicted in accordance with an illustrative embodiment. In this illustrative example, application modernization environment 400 includes components that can be implemented in hardware such as the hardware shown in cloud computing environment 100 in FIG. 1 and network data processing system 300 in FIG. 3.

In this illustrative example, application modernization environment 400 is an environment in which applications 402 can be modernized by modernization system 404. For example, modernization can include at least one of such as retire, replace, rewrite, re-platform, or other suitable changes for a number of applications 402.

As depicted, modernization system 404 comprises computer system 406 and application modernizer 408 that can operate to manage applications 402 by analyzing and modernizing applications 402 in addition to other operations that may be performed to manage applications 402. Application modernizer 408 can be implemented in software, hardware, firmware or a combination thereof. When software is used, the operations performed by application modernizer 408 can be implemented in program instructions configured to run on hardware, such as a processor unit. When firmware is used, the operations performed by application modernizer 408 can be implemented in program instructions and data and stored in persistent memory to run on a processor unit. When hardware is employed, the hardware may include circuits that operate to perform the operations in application modernizer 408.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 406 is a physical hardware system and includes one or more data processing systems. When more than one data processing system is present in computer system 406, those data processing systems are in communication with each other using a communications medium. The communications medium can be a network. The data processing systems can be selected from at least one of a computer, a server computer, a tablet computer, or some other suitable data processing system.

As depicted, computer system 406 includes a number of processor units 410 that are capable of executing program instructions 412 implementing processes application modernizer 408 in the illustrative examples. As used herein a processor unit in the number of processor units 410 is a hardware device and is comprised of hardware circuits such as those on an integrated circuit that respond and process instructions and program code that operate a computer. When a number of processors units 410 execute program instructions 412 for a process, the number of processors units 410 is one or more processors units that can be on the same computer or on different computers. In other words, the process can be distributed between processors units on the same or different computers in a computer system. Further, the number of processors units 410 can be of the same type or different type of processors units. For example, a number of processors units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, application modernizer 408 analyzes each application in applications 402 in isolation from other applications to identify issues 414 in code 416 for applications 402 and for a number of common code components 418 in code components 420. In this illustrative example, the analysis of applications 402 and code components 420 is performed on a binary form of the software. In other illustrative examples, the analysis can be performed on source code forms of applications 402 and code components 420.

In this illustrative example, a code component in code components 420 is code that can be used in an application in applications 402. For example, a code component can be code that is accessed or called by an application. In one example, a code component in code components 420 can be a library.

Further in the illustrative example, a common code component in common code components 418 is code that is used by more than one application in applications 402. Currently available code scanning tools can be used to determine when applications 402 have common code components 418 and provide information used to identify and resolve issues 414 in code 416.

The number of common code components 418 can be selected from at least one of a Java Archive file, a library, a collection of subroutines, a collection of procedures, a collection of scripts, classes, or some other code that can be used by multiple applications. In this illustrative example, the common code component can be accessed or called by an application during execution of the application.

The analysis for identifying issues 414 in code 416 can be performed to identify changes needed for an application or code component used by the application to have the application or code component run in a different environment. A different environment can be, for example, a different computing platform, such as from running in an on-premises environment to run in a new environment such as from a traditional local area network to cloud computing environment. With the change in the computing platform, code components 420 in the form of application programming interfaces need to be changed, updated, or add to provide the desired functionality for applications 402 in the new computing platform.

As another example, modernization can be performed to change the architecture for the application to improve the performance of the application. For example, an application can be changed from running as a single, n-tier application to one using micro services. In this example, code changes may be needed to change the application from running as a single n-tier application to using a collection of microservices for the individual services in the application. As another example, environmental change can include moving an application and its code components into a containerized environment.

An issue in issues 414 is a problem with code 416 that is to be resolved such that the application or common code component in which code 416 is located can run as desired for a particular environment. For example, resolving the issue with code 416 may include at least one of replacing code 416, rewriting a portion of code 416, removing code 416, adding new code to code 416, or other suitable actions that enable the application or common code component to run in the desired environment.

For example, code 416 can be rewritten such that services in an application are provided using microservices. As another example, a common code component may be a Java archive (JAR) the resolution of the issue for running in a new environment, such as a cloud computing environment, may be to package the Java archive in a container for use in a cloud computing environment.

As another example, code 416 can be code in a code component such as an application programming interface (API). A current implementation of an application programming interface using the current environment may not work properly in a new environment. As result, the current application programming interface may need to be changed to a supporting application programming interface. As another example, a JAR packaged with a server runtime may not run properly in a new environment. As a result, the JAR may need to be packaged with an application rather than depending on a JAR packaged with a server runtime. In yet another illustrative example, application programming interface needed by an application may need to be rewritten because the application programming interface is unavailable in a new environment. These example issues in their solutions are illustrative examples and not meant to be exhaustive as to the issues and solutions that may be present in modernizing applications 402.

As depicted, application modernizer 408 creates directed graph structure 422 using the issues 414 identified in applications 402 and the number of common code components 418. In this illustrative example, directed graph structure 422 includes relationships 424 between the applications 402, the number of common code components 418, and issues 414 identified.

For example, directed graph structure 422 can include nodes 426 and arcs 428 that connect nodes 426 and define relationships 424. For example, nodes 426 can represent applications 402, common code components 418, and issues 414. Arcs 428 can define the relationships 424 between applications 402, common code components 418, and issues 414 represented as nodes 426.

Application modernizer 408 can determine common code component modernization cost 430 for the number of common code components 418 using directed graph structure 422. Additionally, application modernizer 408 can determine application modernization cost 432 for a set of applications 402 using directed graph structure 422. In this example, application modernization cost 432 for the set of the applications 402 takes into account common code component modernization cost 430 for modernizing the number of common code components 418 a single time.

As an additional feature, application modernizer 408 can identify a set of common code resolutions 434 for at least one of applications 402 or a number of common code components 418 in code components 420. In an illustrative example, common code resolutions 434 can be for issues 414 identified in applications 402 or the number of common code components 418. The number of code components 420 do not need to be common code components 418 when identifying common code resolutions 434.

In the illustrative example, a common code resolution in common code resolutions 434 is an action, fix, solution, or process that is performed to resolve an issue in issues 414 in an application in applications 402 or a code component in code components 420. When the common code resolution is created for an issue in an application, that common code resolution can be used again for the same issue in another application. Additionally, when the common code resolution is created for the issue in a code component, that common code resolution can be used to resolve the same issue in another code component. The reuse of the common code resolution in another application or code component can be performed at a lower cost than the original creation of the common code resolution.

As a result, a common code resolution used to resolve an issue for an application can be used to resolve the same issue for another application at a lower cost than the original cost for creating the common code resolution. The same savings can be obtained for a common code resolution used to resolve an issue for another code component.

The same issue can be resolved for another code component a lower cost using the common code resolution originally created for the issue. Cost savings are present because changes to the common code resolution to apply that resolution to the same issue for another application or another code component can be made using less time as compared to the original creation of the common code resolution. Thus, in an illustrative example, once a technique is determined or created to resolve an issue with code in an application or a code component, the cost to resolve the same issue for another application or code component is reduced using the same technique because institutional knowledge about the technique is present.

In one illustrative example, one or more solutions are present that overcome a problem with modernizing applications. One or more illustrative examples enable more accurately determining the cost for modernizing applications in an environment. One or more illustrative examples take into account that taking into account shared code between applications provide a more accurate determination of the cost for modernizing the applications. The shared code is also referred to as a common code component. One or more illustrative examples can provide a more realistic process for modernizing applications based on the increased accuracy in determining the cost.

Computer system 406 can be configured to perform at least one of the steps, operations, or actions described in the different illustrative examples using software, hardware, firmware or a combination thereof. As a result, computer system 406 operates as a special purpose computer system in which application modernizer 408 in computer system 406 enables determining a modernization cost for a set of applications. In particular, application modernizer 408 transforms computer system 406 into a special purpose computer system that provides modernization costs with greater accuracy as compared to currently available general computer systems that do not have application modernizer 408.

The illustration of application modernization environment 400 in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 5:
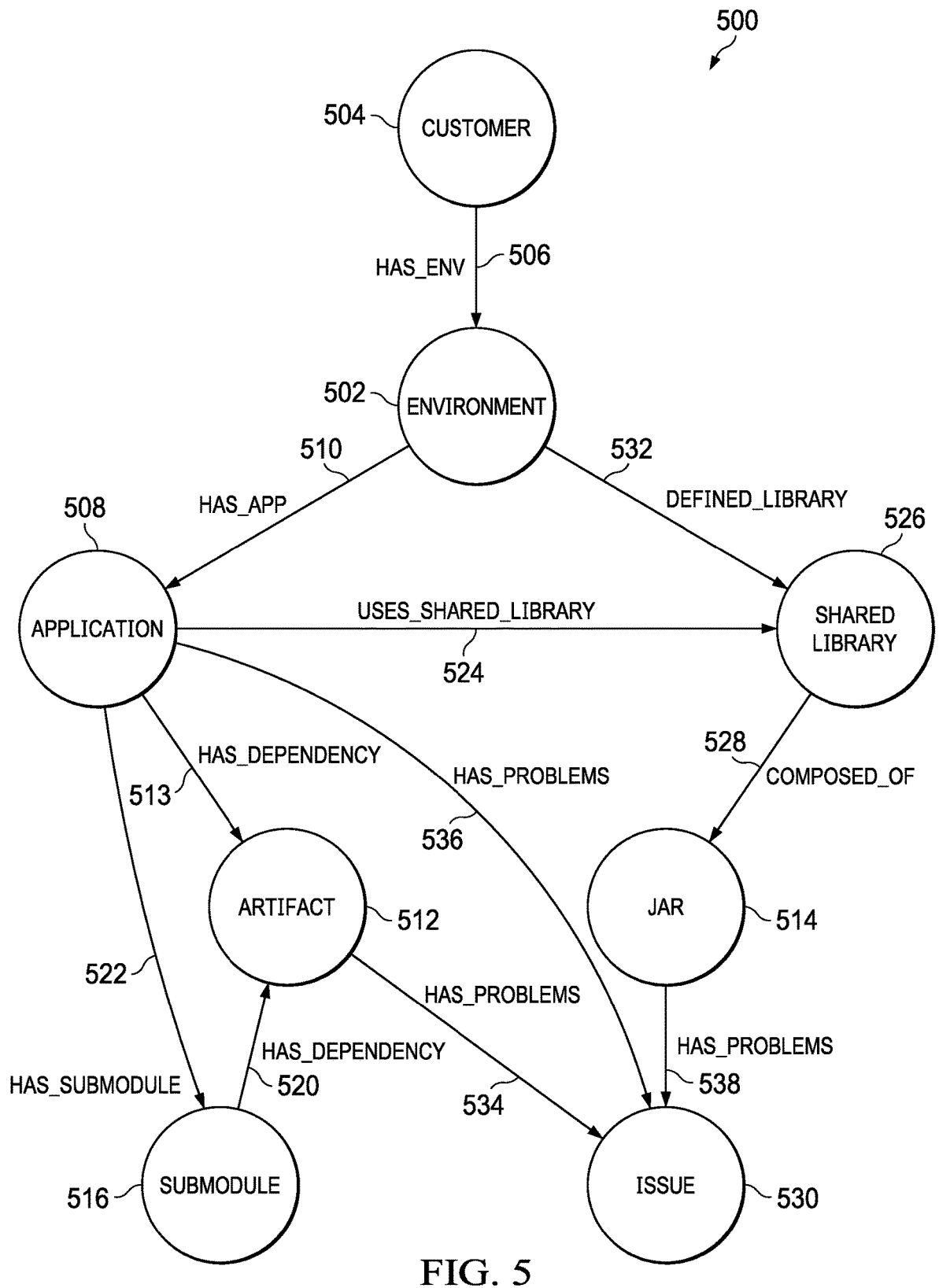
FIG. 5 is a directed graph structure containing an application in accordance with an illustrative embodiment.

Turning next to FIG. 5, a directed graph structure containing an application is depicted in accordance with an illustrative embodiment. This illustrative example is an example of an implementation for directed graph structure 422 in FIG. 4.

As depicted, directed graph structure 500 comprises vertices and arcs connecting vertices. These vertices are also referred to as nodes in this illustrative example. The arcs are used to indicate relationships between different nodes and directed graph structure 500. In this illustrative example, directed graph structure 500 is an example of a structure that can be used to store information about applications, common code structures, and issues in code requiring changes to modernize the applications.

As depicted, environment 502 belongs to customer 504 as indicated by HAV_ENV 506. In this example, environment 502 has application 508 as indicated by HAS_APP 510. Application 508 has artifact 512 as shown by HAS-DEPENDENCY 513. Artifact 512 can take a number of different forms. For example, artifact 512 can represent code components such as submodule 516 as shown by HAS_DEPENDENCY 520.

Submodule 516 is a code component that belongs to application 508 as indicated by HAS_SUBMODULE 522. In this illustrative example, JAR 514 is a code component used by application 508 as indicated by USES_SHARED_LIBARY 524 connecting application 508 to shared library 526. JAR 514 is part of shared library 526 as indicated by COMPOSED_OF 528. Shared library 526 is available in environment 502 for inclusion or use by application 508 as indicated by DEFINED_LIBARY 532.

In this illustrative example, artifact 512 can also be used to represent issue 530 is indicated by HAS_PROBLEMS 534. In this example, application 508 can have issue 530 as indicated by HAS_PROBLEMS 536. As another example, JAR 514 can also have issue 530 as indicated by HAS_PROBLEMS 538. The resolution of issue 530 for application 508 can be different from the resolution of issue 530 for JAR 514.

The illustration of directed graph structure 500 is presented to show how in application and various code components, the relationships, and issues can be represented. This representation is not meant to limit the manner in which other directed graph structures can be created or implemented. For example, a directed graph structure may not show artifact 512 generally but still show instances of artifacts such as submodule 516 and JAR 514 with arcs for the relationships to application 508. As another example, submodule 516 may be omitted in other examples and additional jars may be present for application 508. Further, for purposes of different illustrative examples, shared library 526 can be omitted and an arc directly connecting application 508 to JAR 514 can be used to indicate the application 508 uses JAR 514.

Figure 7:
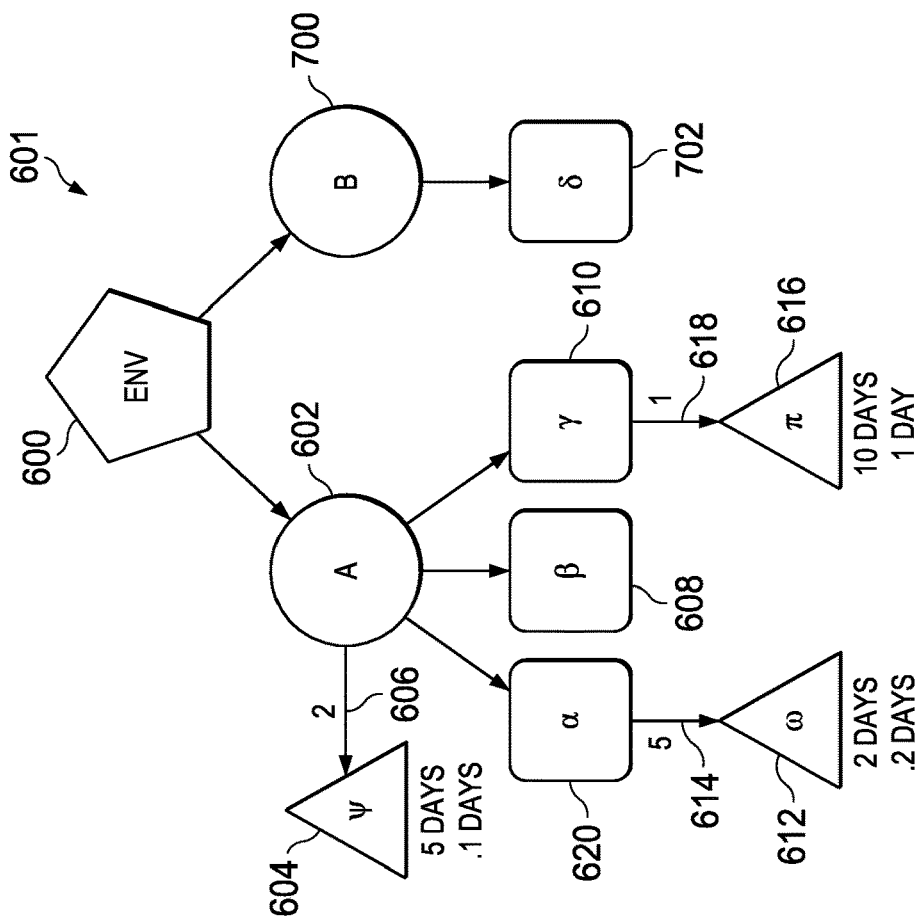
FIG. 7 is a directed graph structure having two applications with a common code component in accordance with an illustrative embodiment.
Figure 6:
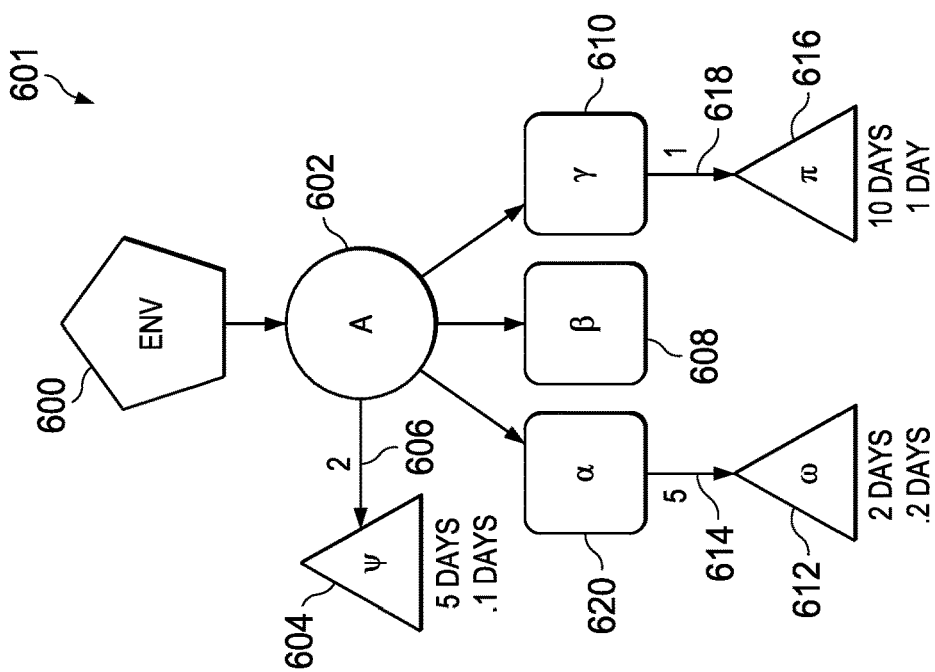
FIG. 6 is a directed graph structure with a single application in accordance with an illustrative embodiment.
Figure 8:
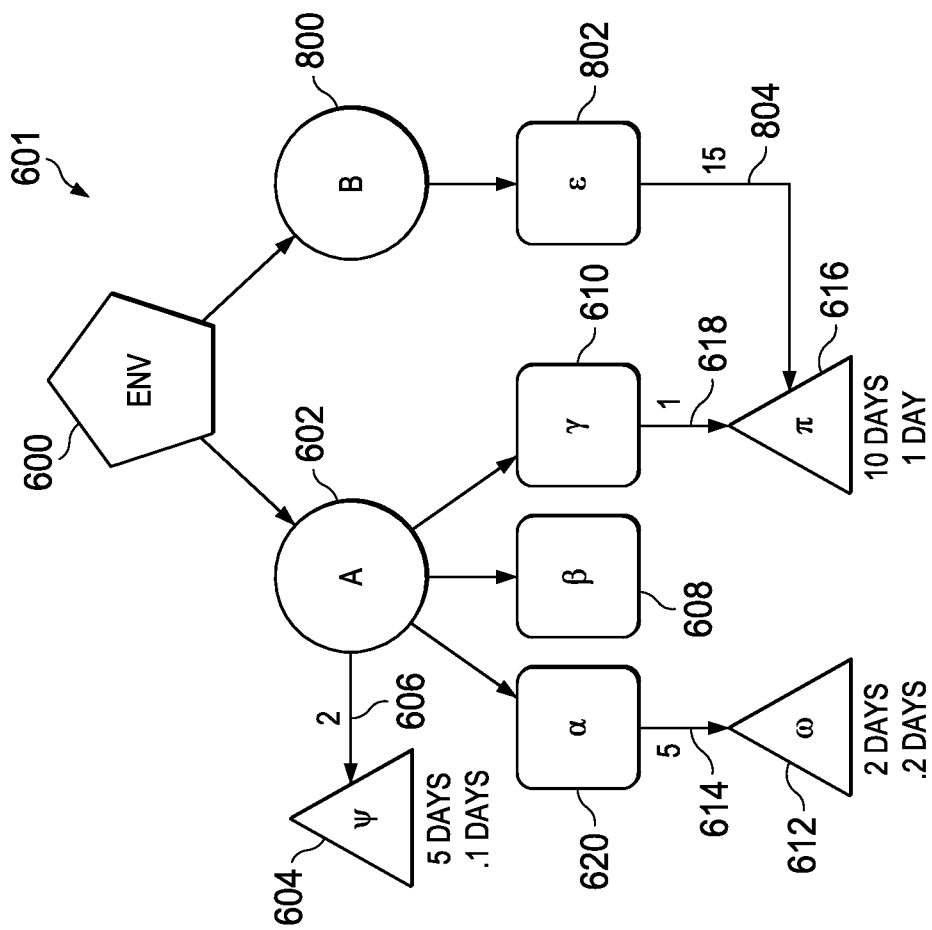
FIG. 8 is a directed graph structure having instance cost reduction for the same issue in accordance with an illustrative embodiment.

With reference now to FIGS. 6-8, directed graph structure used in determining the cost for modernizing applications are depicted in accordance with an illustrative embodiment. With reference first to FIG. 6, a directed graph structure with a single application is depicted in accordance with an illustrative. As depicted, environment 600 in directed graph structure 601 is an example of an implementation for directed graph structure 422 in FIG. 4. In this illustrative example, directed graph structure 601 has a single application, application A 602. In this illustrative example, the code in application A 602 has issue $\psi$ 604 that occurs two times in application A 602 as indicated by arc 605 connecting application A 602 to issue $\psi$ 604. In other words, issue $\psi$ 604 can occur in two different locations within application A 602 in which issue $\psi$ 604 should be resolved as part of modernizing application A 602.

In this illustrative example, application A 602 uses code components in the form of library $\alpha$ 620, library $\beta$ 608, and library $\gamma$ 610. These libraries are collections of nonvolatile resources used by application A 602. The libraries can include, for example, configuration data, documentation, help data, message templates, code, subroutines, classes, functions, values, or other information or code.

As depicted, library α 606 has 5 occurrences of issue ω 612 as indicated by arc 614 connecting library α 620 to issue ω 612. Library γ 610 has one occurrence of issue π 616 as indicated by arc 618 connecting library γ 610 to issue π 616. In this example, library β 608 has no issues.

In this illustrative example, resolving issue ψ 604 for application A 602 has a full cost of 5 days for the first time this issue is resolved in application A 602. With a second instance of this issue in application A 602, a reduced cost of 0.1 days is present. This reduced cost can occur because the resolution identified for the issue in a first location in application A 602 can be applied to resolve the same issue in a second location in application A 602 using less time. The time, work, and effort used to determine the resolution first time can be applied to another location in the same application, other applications, or other code components with a reduced amount of time to adapt that resolution to a different location.

In a similar fashion, cost of 2 days is present for the first time that issue ω 612 is resolved for library α 620. Subsequent resolutions of the same issue in other locations in library α 620 takes 0.2 days. As depicted, resolving issue π 616 the first time is 10 days with the cost of 1 day for subsequent resolutions of the same issue in other locations in library γ 610. In this case, cost savings does not occur because issue π 616 is only resolved once for library γ 610.

In this example, the cost to modernize application A 602 is 17.9 days. Issue ψ 604 for application A 602 has a cost as follows: 5 days+((2−1)*0.1 day)=5.1 days. In this example, issue ω 612 for library α 620 has a cost as follows: 2 days+(5−1)*0.2 days=2.8 days. Issue π 616 has a cost of 10 days. In this example, only a single application shown in which a cost efficiency is not available without comment code components shared with other applications. However, efficiencies are present in this illustrative example for resolving the same issue more than once. In this example, 17.9 days to modernize application A 602 is an example of application modernization cost 432 in FIG. 4.

Turning now to FIG. 7, a directed graph structure having two applications with a common code component is depicted in accordance with an illustrative embodiment. In the illustrative examples, the same reference numeral may be used in more than one figure. This reuse of a reference numeral in different figures represents the same element in the different figures.

In this figure, directed graph structure 601 includes application A 602 and application B 700 in environment 600. In this example, cost savings are present for resolving issues to modernize application A 602 and application B 700 in which common code components are present between these two applications.

As depicted, application B 700 has no code issues. Application B 700 also includes a copy of library γ 610 and includes library δ 702. In this illustrative example, library γ 610 has the same issue as application A 602 for library γ 610 because library γ 610 is a common code component between application A 602 and application B 700.

In this illustrative example, the modernization of application A 602 is 17.9 days. Modernizing application B 700 in isolation from application A 602 is 10 days. The cost of 10 days results from resolving issue π 616 for library γ 610 in application B 700.

However, when looking at environment 600 as a whole, containing application A 602 and application B 700, application B 700 can use the modernized form of library γ 610 without needing to again resolve issue π 616 for library γ 610. In other words, the modernization of library γ 610 is performed a single time and does not have to be performed again for application B 700 to be modernized. As result, no cost is needed to modernize application B 700 having library γ 610 because library γ 610 is modernized to resolve the same issue for use by application A 602.

As result, modernizing application A 602 and application B 700 and their code components is 17.9 days, which is an example of application modernization cost 432 in FIG. 4 in this illustrative example. No additional cost is present because of the common code component, library γ 610, between application A 602 and application B 700. Thus, a cost savings of 10 days occurs because of the common code component that enables code reuse.

With reference to FIG. 8, a directed graph structure having instance cost reduction for the same issue is depicted in accordance with an illustrative. As depicted, application A 602 and application C 800 is present in environment 600.

In this illustrative example, application C 800 has library ε 802. Application C 800 has issues with library ε 802 needing modernization. In this example, 15 instances of issue π 616 are present for library ε 802 as indicated by arc 804 connecting library ε 802 to issue π 616. In this illustrative example, the cost to modernize application C 800 by resolving issue π 616 for library ε 802 is 24 days when the modernization cause for application C 800 is determined in isolation from other applications. This determination can be made by determining the cost to modernize application C 800 in isolation. This example, this cost is 10 days+((15−1)*1 day)=24 days.

With this case, a modernization of environment 600 with both application A 602 and application C 800 is 41.9 days when the modernization cost is calculated by evaluating the applications in isolation from each other. This cost is 17.9 days for application A 602 and its associated code components and 24 days for application C 800 and its associated code component.

However, when taking into account a resolution of issue π 616 for library ε 802 performed for library γ 610 in application A 602, a cost savings can occur through institutional knowledge on how to fix issue π 616. In other words, once the initial technique or process used to an issue is known, the same technique or process can be used to the same issue even though the same issue is for a different code component.

As a result, in applying the institutional knowledge, the cost for resolving issue of issue π 616 for library ε 802 is 15 days instead of 24 days. As a result, modernizing environment 600 with application A 602 and its code components and application C 800 and its code components can be reduced to 32.9 days. This cost is 17.9 days for application A 602 and its associated code components and 15 days for application C 800 and its associated code component. The cost of 17.9 days is an example of application modernization cost 432 in FIG. 4. In this example, the cost of 9 days is saved using the institutional knowledge of how to resolve issue π 616.

For example, if the resolution for an issue is to create and modify an application programming interface to access a function for a first application, the same resolution can be used to create and modify another application programming interface to access the same function for a second application. Modifying the second application program interface can have a reduced amount of time because time and effort spent in determining the modifications for the first application programming interface can be applied in creating the modification of the second application programming interface. A cost still present but reduced because of the knowledge gained from modifying the first application programming interface The illustration of directed graph structure 601 in FIGS. 6-8 have been having provided for purposes of depicting one or more features in the illustrative examples. These illustrations are not meant to limit the manner in which other illustrative examples can be implemented. For example, an environment for application modernization can have thousands or tens of thousands of applications rather than the two applications illustrated in FIG. 7 and FIG. 8. Within an environment with numerous applications, many common code components can be present in which modernizing one of the common code components can reduce the amount of time needed to modernize the applications in the environment when the cost to modernize was performed by analyzing applications in isolation from other applications as compared to current techniques for determining modernization costs.

As another example, other types of common code components in addition to library can be present in an environment. For example, other types of components that can be used by more than one application includes a JAR, a collection of scripts, a collection of procedures, or other types of code components that can be used by more than one application.

Figure 9:
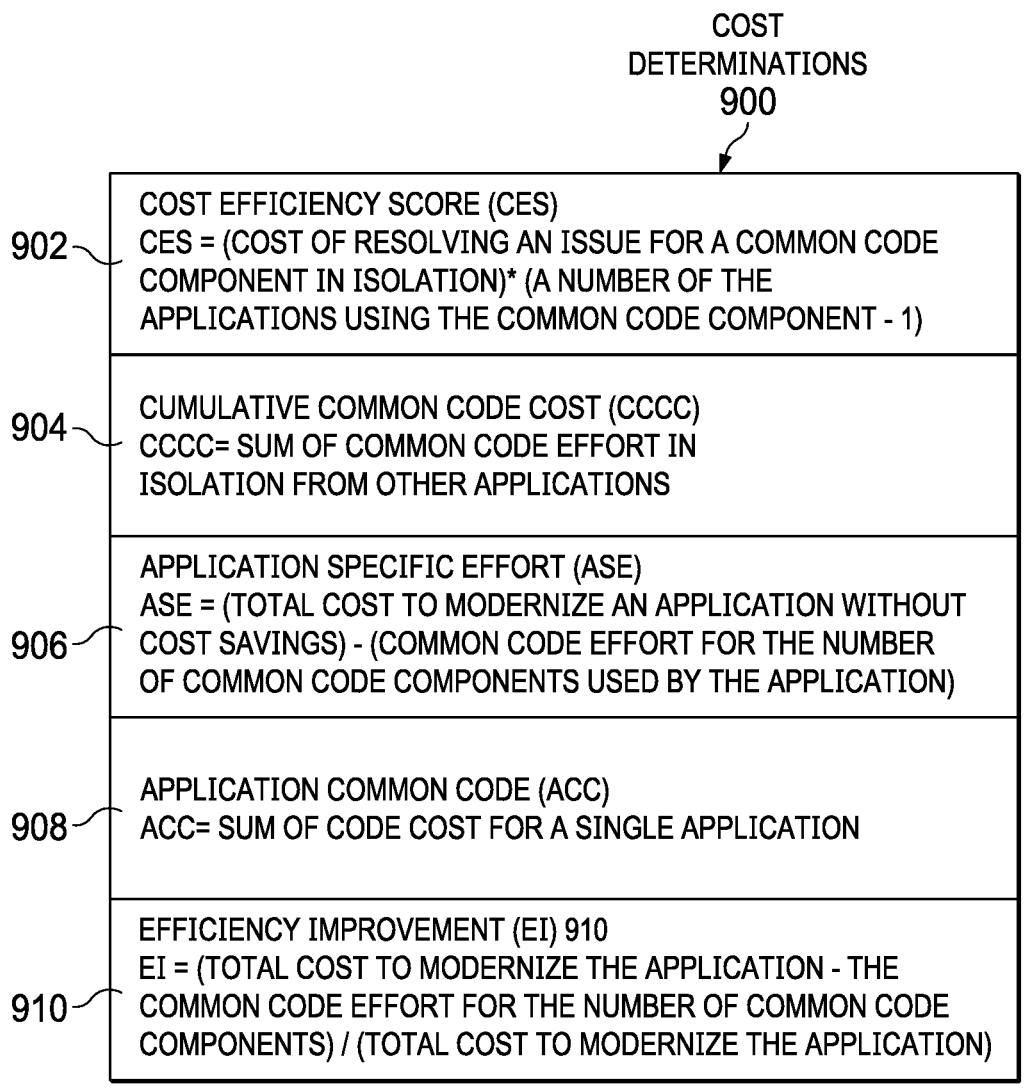
FIG. 9 is an illustration of cause determinations for modernizing applications in accordance with an illustrative embodiment.

With reference now to FIG. 9, an illustration of cost determinations for modernizing applications is depicted in accordance with an illustrative embodiment. In this illustrative example, cost determinations 900 can include cost efficiency score (CES) 902, cumulative common code cost (CCCC) 904, application specific effort (ASE) 906, application common code (ACC) 908, and efficiency improvement (EI) 910.

In this illustrative example, cost efficiency score (CES) 902 can be determined for each node in a directed graph structure. For example, cost efficiency score (CES) 902 can be determined for each application, submodule, jar, or other code node in a directed graph structure. A code node is a node that represents code such as application, library, jar, or other code.

In this illustrative example, cost efficiency score (CES) 902 can be determined as follows:

CES=(cost of resolving an issue for a common code component in isolation)*(a number of the applications using the common code component−1).

For example, if JAR1 takes 10 days to resolve a problem for modernization and 15 applications use JAR1, the then cost efficiency score (CES) 902 for JAR1=(10 days)*(15 applications−1)=140 days as a savings because JAR1 is a common code component used by 15 applications. The cost to resolve the issue for JAR1 is performed once with the benefit of the resolution of the issue for JAR1 being applied to all of the other applications that use JAR1.

As depicted, cumulative common code cost (CCCC) 904 represents the total amount of effort to modernize common code components across all applications for a modernization effort. Cumulative common code cost (CCCC) 904 can be determined as follows:

CCCC=Sum of common code effort in isolation from other applications.

For example, if the common code components are three JARs with a cost to resolve issues as follows: JARA=10 days, JARB=3 days, and JARC=15 days, cumulative common code cost (CCCC) 904=10 days+3 days+15 days=28 days.

In other words, 28 days is a cost to update any application that uses JARA, JARB, and JARC. Once this cost is paid once through resolving the code issue to modernize the JARs, all other applications can leverage the use of the updated code in these JARs with a zero cost.

In this illustrative example, application specific effort (ASE) 906 is the cost for modernizing an application taking into account that the modernization cost has been paid for the common code components used by the application. Application specific effort (ASE) 906 can be determined as follows:

ASE=(total cost to modernize an application without cost savings)−(common code effort for the number of common code components used by the application).

For example, if Application 1 uses JARA and JARC, ASE=(64 days)−(10 days−15 days)=39 days. As a result, the cost to modernize Application 1 is 39 days instead of 64 days.

In illustrative example, application common code (ACC) 908 is determined as follows:

ACC=sum of code cost for a single application.

For example, for Application 2 uses JARA and JARC, ACC=10 days+15 days=25 days.

As depicted, efficiency improvement (EI) 910 is determined by taking into account the cost savings to modernize an application having the number of common code components. Efficiency improvement (EI) 910 can be determined as follows:

EI=(total cost to modernize the application−the common code effort for the number of common code components)/(total cost to modernize the application).

For example, if Application 2 has total cost of 28 days and uses JARA and JARC, EI=(28 days−(25 days)/(28 days) =10% of original cost. In this case, a 90% cost reduction is present for Application 2 taking into account the reduction from common code components for which updates have been made from modernizing Application 1 which includes JARA and JARC. The full effort in terms of cost is still applicable to Application 1. However, for other applications that use any of JARA, JARB, or JARC, no cost is present for those JARs since the JARs have already been updated as part of modernizing Application 1.

Figure 10:
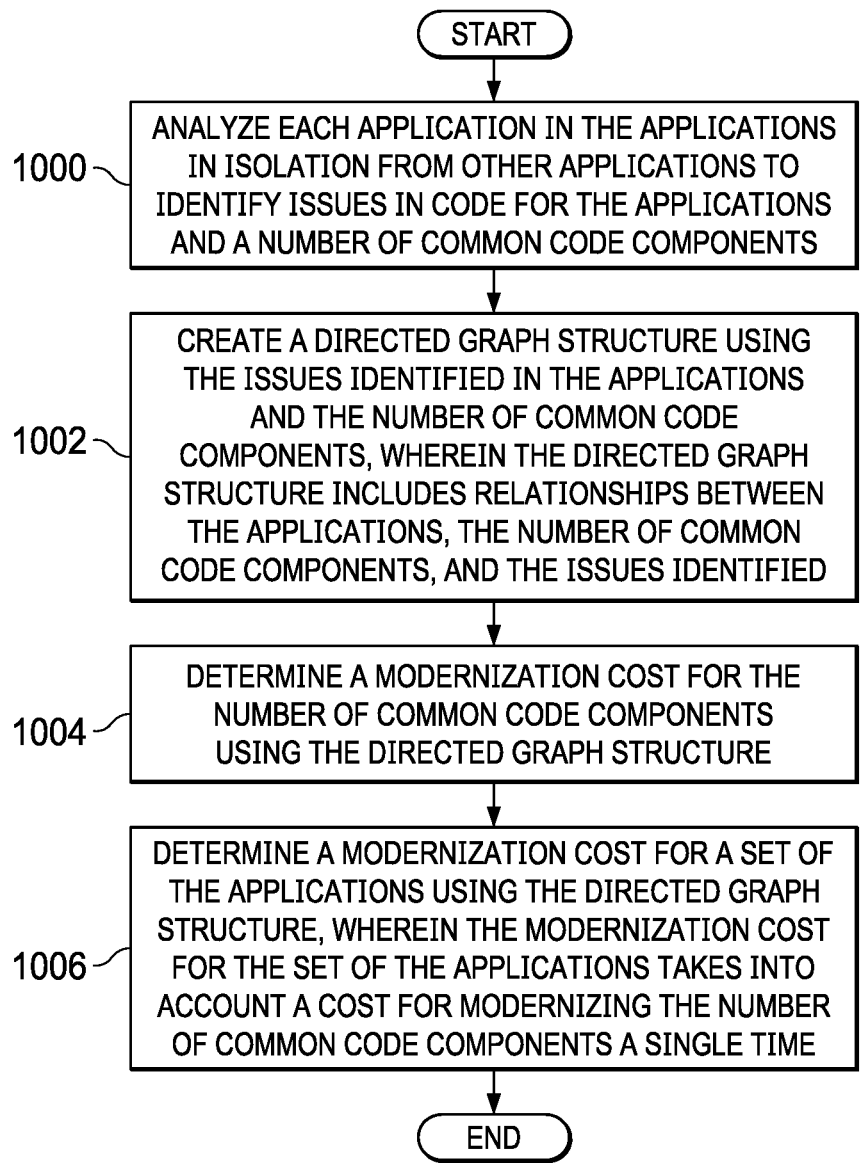
FIG. 10 is a flowchart of a process for modernizing applications in accordance with an illustrative embodiment.

Turning next to FIG. 10, a flowchart of a process for modernizing applications is depicted in accordance with an illustrative embodiment. The process in FIG. 10 can be implemented in hardware, software, or both. When implemented in software, the process can take the form of program instructions that is run by one of more processor units located in one or more hardware devices in one or more computer systems. For example, the process can be implemented in application modernizer 408 in computer system 406 in FIG. 4.

The process begins by analyzing each application in the applications in isolation from other applications to identify issues in code for the applications and a number of common code components (step 1000). In step 1000, this analysis can identify issues from both within the application being analyzed in any common code components that the application may share with other application being considered for modernization. The issues involve changes that may be needed to the application for common code components such that the application can run in a desired manner for a particular environment. For example, an application may be moved from non-premises environment to a cloud computing environment. Various changes can be needed to enable the application to run in the cloud computing environment.

The process creates a directed graph structure using the issues identified in the applications and the number of common code components, wherein the directed graph structure includes relationships between the applications, the number of common code components, and the issues identified (step 1002). The process determines a modernization cost for the number of common code components using the directed graph structure (step 1004). In step 1004, the modernization cost is the time needed to perform the different changes to the applications for modernizing mission. The process determines a modernization cost for a set of the applications using the directed graph structure, wherein the modernization cost for the set of the applications takes into account a cost for modernizing the number of common code components a single time (step 1006). The process terminates thereafter.

Figure 11:
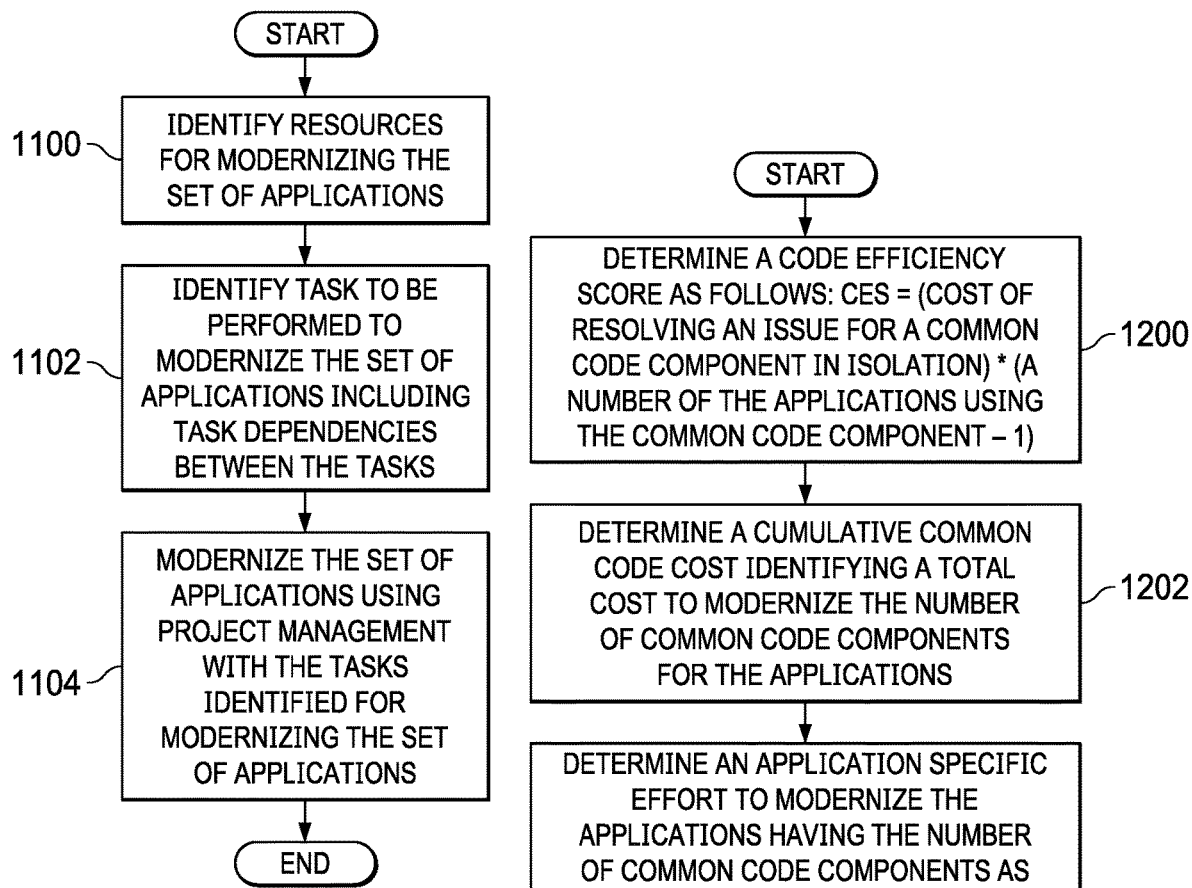
FIG. 11 is a flowchart of a process for modernizing applications in accordance with an illustrative embodiment.

With reference now to FIG. 11, a flowchart of a process for modernizing applications is depicted in accordance with an illustrative embodiment. The steps in FIG. 11 are examples of additional steps that can be performed with the steps in FIG. 10.

The process begins by identifying resources for modernizing the set of applications (step 1100). In step 1100, the set of resources can be programmers, software engineers, or other personnel needed to perform the modernization of the applications. For example, if the cost to modernization of the set of applications is two years, and personnel resources can be identified for performing various tasks needed to perform the modernization based on the cost.

The process then identifies task to be performed to modernize the set of applications including task dependencies between the tasks (step 1102). The process then modernizes the set of applications using project management with the tasks identified for modernizing the set of applications (step 1104). The process terminates thereafter.

Figure 12:
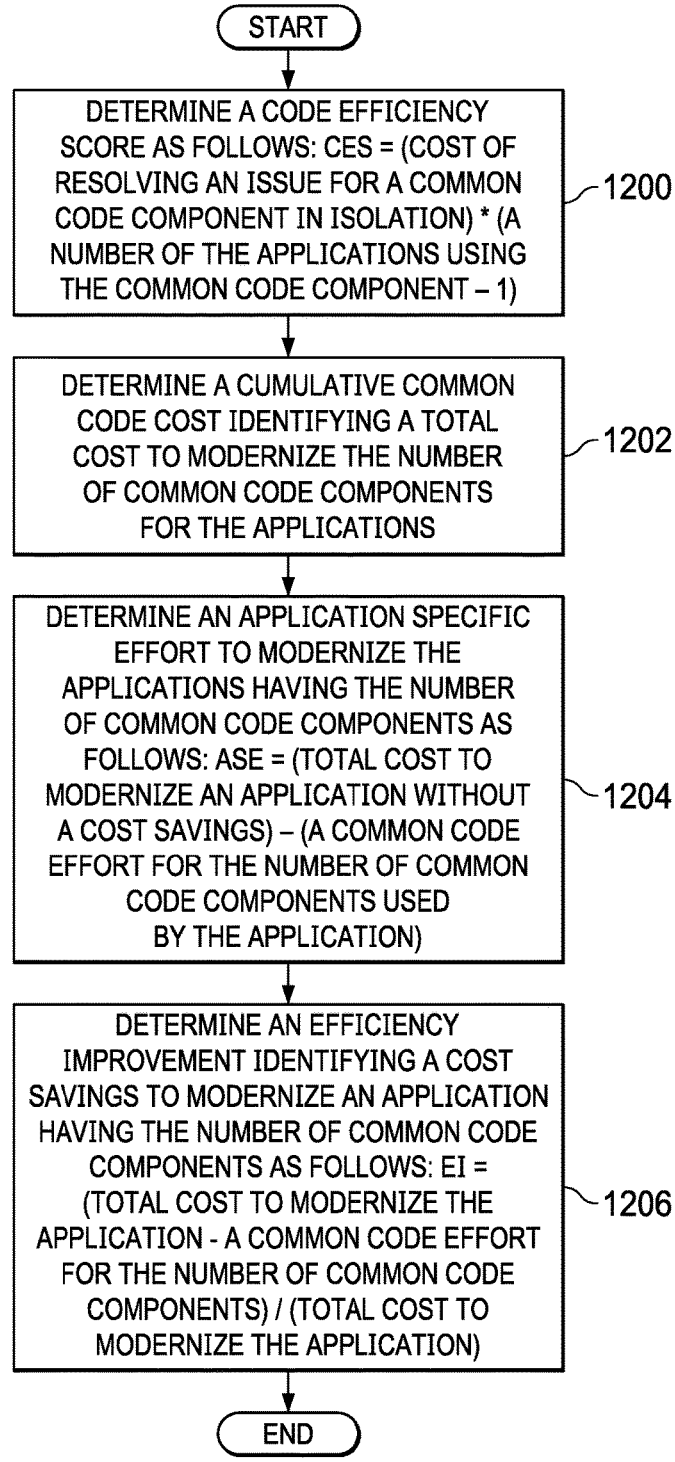
FIG. 12 is a flowchart illustrating cost determinations in accordance with an illustrative embodiment.

With reference next to FIG. 12, a flowchart illustrating cost determinations is depicted in accordance with an illustrative embodiment. The steps in this flowchart are examples of steps that can be performed to determine cost for use in determining a modernization cost for the set of applications.

The process begins by determining a code efficiency score as follows: CES=(cost of resolving an issue for a common code component in isolation)*(a number of the applications using the common code component−1) (step 1200). The process determines a cumulative common code cost identifying a total cost to modernize the number of common code components for the applications (step 1202). The process determines an application specific effort to modernize the applications having the number of common code components as follows: ASE=(total cost to modernize an application without a cost savings)−(a common code effort for the number of common code components used by the application) (step 1204). The process determines an efficiency improvement identifying a cost savings to modernize an application having the number of common code components as follows: EI=(total cost to modernize the application−a common code effort for the number of common code components)/(total cost to modernize the application)(step 1206). The process terminates thereafter.

Figure 13:
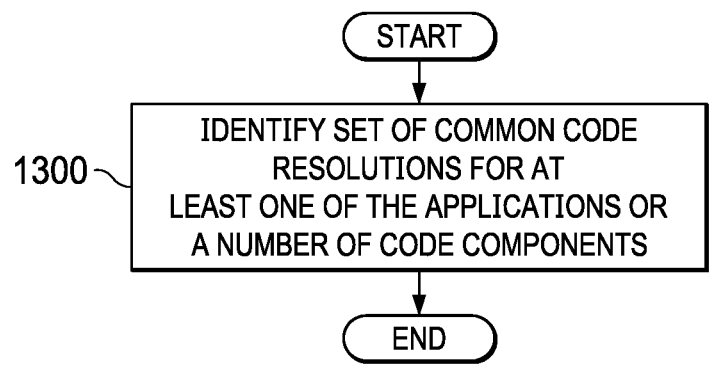
FIG. 13 is a flowchart illustrating determining common code resolutions in accordance with an illustrative embodiment.

Turning to FIG. 13, a flowchart illustrating determining common code resolutions is depicted in accordance with an illustrative embodiment. The steps in this flowchart are examples of steps that can be performed to determine cost for use in determining a modernization cost for the set of applications.

The process identifies set of common code resolutions for at least one of the applications or a number of code components (step 1300). The process terminates thereafter. With the determination of common code resolutions, step 1004 in FIG. 10 can determine the modernization cost for the set of the applications using the directed graph structure taking into account a cost savings resulting from resolving the issues in the number of common code components the single time and the set of code resolutions for a set of issues for at least one of the applications or code components. In this manner, code resolutions for issues that may be applicable to different applications or code components can provide cost savings because of institutional knowledge gained from sobbing the issue a first time. The technique or knowledge gained from solving the issue can be applied to another application or software component that is not the same application or software component using less time because of the knowledge gained from solving the issue previously.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 14:
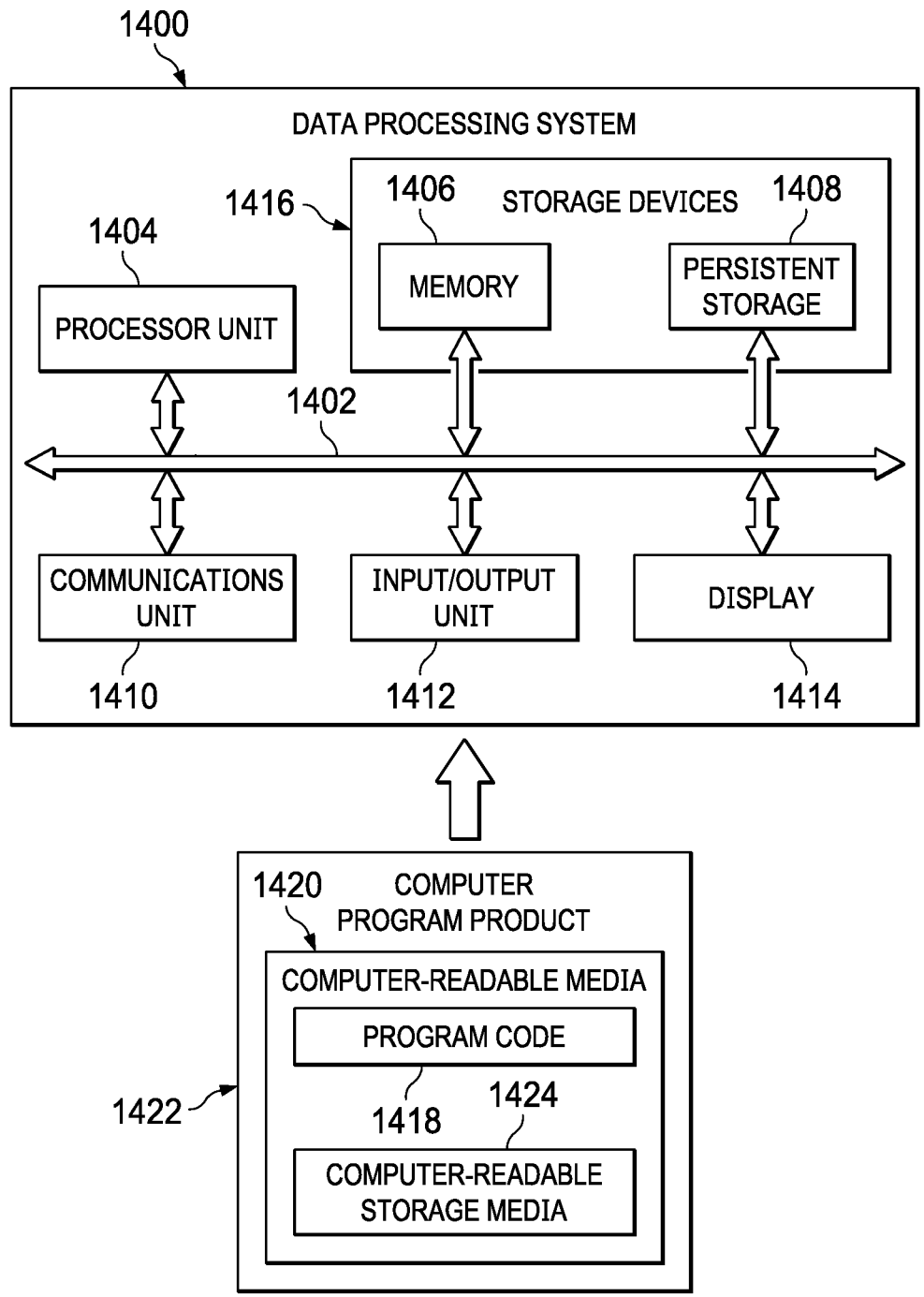
FIG. 14 is a block diagram of a data processing system in accordance with an illustrative embodiment.

Turning now to FIG. 14, a block diagram of a data processing system is depicted in accordance with an illustrative embodiment. Data processing system 1400 can be used to implement at least one of cloud computing nodes 110 in FIG. 1, personal digital assistant (PDA) or smart phone 120A, desktop computer 120B, laptop computer 120C, or automobile computer system 120N in FIG. 1. Data processing system 1400 can be used to implement computers in hardware and software layer 202 in FIG. 2 as well as server computer 304, server computer 306, and client devices 310 in FIG. 3. Data processing system 1400 can also be used to implement computer system 406 in FIG. 4. In this illustrative example, data processing system 1400 includes communications framework 1402, which provides communications between processor unit 1404, memory 1406, persistent storage 1408, communications unit 1410, input/output (I/O)

unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can may be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program instructions, computer usable program instructions, or computer-readable program instructions that can be read and executed by a processor in processor unit 1404. The program instructions in the different embodiments can be embodied on different physical or computer-readable storage media, such as memory 1406 or persistent storage 1408.

Program instructions 1418 is located in a functional form on computer-readable media 1420 that is selectively removable and can be loaded onto or transferred to data processing system 1400 for execution by processor unit 1404. Program instructions 1418 and computer-readable media 1420 form computer program product 1422 in these illustrative examples. In the illustrative example, computer-readable media 1420 is computer-readable storage media 1424.

Computer-readable storage media 1424 is a physical or tangible storage device used to store program instructions 1418 rather than a medium that propagates or transmits program instructions 1418. Computer readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1418 can be transferred to data processing system 1400 using a computer-readable signal media. The computer-readable signal media are signals and can be, for example, a propagated data signal containing program instructions 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1420" can be singular or plural. For example, program instructions 1418 can be located in computer-readable media 1420 in the form of a single storage device or system. In another example, program instructions 1418 can be located in computer-readable media 1420 that is distributed in multiple data processing systems. In other words, some instructions in program instructions 1418 can be located in one data processing system while other instructions in program instructions 1418 can be located in another data processing system. For example, a portion of program instructions 1418 can be located in computer-readable media 1420 in a server computer while another portion of program instructions 1418 can be located in computer-readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program instructions 1418.

Thus, illustrative embodiments provide a computer implemented method, computer system, and computer program product for analyzing applications for modernization. Processor units analyze each application in the applications in isolation from other applications to identify issues in code for the applications and a number of common code components. The processor units create a directed graph structure using the issues identified in the applications and the number of common code components. The directed graph structure includes relationships between the applications, the number of common code components, and the issues identified. The processor units determine a common code component modernization cost for the number of common code components using the directed graph structure. The processor units determine an application modernization cost for a set of the applications using the directed graph structure. The application modernization cost for the set of the applications takes into account the common code component cost for modernizing the number of common code components a single time.

In one or more illustrative examples, the determination of the cost to modernize applications takes into account that some code can be common code components that are shared or used by more than one application. As a result, in determining the cost to modernize applications, the savings in resolving issues for those common code components can be taken into account. Further, one or more illustrative examples can also take into account cost savings for the development of a resolution of a particular type of issue. The illustrative examples take into account that once a particular type of issue has been resolved, the knowledge gained in resolving the issue can be applied to resolve the same issue for other software with a reduction in time as compared to the cost needed to develop the original resolution for the issue.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for modernizing applications, the computer implemented method comprising:
    analyzing, by a number of processor units, each application in the applications in isolation from other applications to identify issues in code for the applications and a number of common code components;
    creating, by the number of processor units, a directed graph structure using the issues identified in the applications and the number of common code components, wherein the directed graph structure includes relationships between the applications, the number of common code components, and the issues identified;
    determining, by the number of processor units, a common code component modernization cost for the number of common code components using the directed graph structure; and
    determining, by the number of processor units, an application modernization cost for a set of the applications using the directed graph structure, wherein the application modernization cost for the set of the applications takes into account the common code component cost for modernizing the number of common code components.

2. The computer implemented method of claim 1 further comprising:
    identifying, by the number of processor units, a set of common code resolutions for at least one of the applications or a number of code components;
    wherein determining the application modernization cost for the set of the applications using the directed graph structure comprises:
        determining the application modernization cost for the set of the applications using the directed graph structure taking into account a cost savings resulting from resolving the issues in the number of common code components and the set of code resolutions for a set of issues for at least one of the applications or code components.

3. The computer implemented method of claim 1 further comprising:
    determining, by the number of processor units, a code efficiency score as follows:

CES=(cost of resolving an issue for a common code component in isolation)*(a number of the applications using the common code component−1).

4. The computer implemented method of claim 1 further comprising:
    determining, by the number of processor units, a cumulative common code cost identifying a total cost to modernize the number of common code components for the applications.

5. The computer implemented method of claim 1 further comprising:
    determining, by the number of processor units, an application specific effort to modernize the applications having the number of common code components as follows:

ASE=(total cost to modernize an application without a cost savings)−(a common code effort for the number of common code components used by the application).

6. The computer implemented method of claim 1 further comprising:
    determining, by the number of processor units, an efficiency improvement identifying a cost savings to modernize an application having the number of common code components as follows:

EI=(total cost to modernize the application−a common code effort for the number of common code components)/(total cost to modernize the application).

7. The computer implemented method of claim 1, wherein the number of common code components is selected from at least one of a Java Archive file, a library, a collection of subroutines, a collection of procedures, a collection of scripts, or classes.

8. A computer system comprising:
a number of processor units, wherein the number of processor units executes program instructions to:
analyze each application in applications in isolation from other applications to identify issues in code for the applications and a number of common code components;
create a directed graph structure using the issues identified in the applications and the number of common code components, wherein the directed graph structure includes relationships between the applications, the number of common code components, and the issues identified;
determine a common code component modernization cost for the number of common code components using the directed graph structure; and
determine an application modernization cost for a set of the applications using the directed graph structure, wherein the application modernization cost for the set of the applications takes into account the common code component cost for modernizing the number of common code components.

9. The computer system of claim 8, wherein the number of processor units executes program instructions to:
identify a set of common code resolutions for at least one of the applications or the number of common code components;
wherein in determining the application modernization cost for the set of the applications using the directed graph structure, the number of processor units executes program instructions to:
determine the application modernization cost for the set of the applications using the directed graph structure taking into account a cost savings resulting from resolving the issues in the number of common code components and the set of code resolutions for a set of issues for at least one of the applications or code components.

10. The computer system of claim 8, wherein the number of processor units executes program instructions to:
determine a code efficiency score as follows:

CES=(cost of resolving an issue for a common code component in isolation)*(a number of the applications using the common code component−1).

11. The computer system of claim 8, wherein the number of processor units executes program instructions to:
determine a cumulative common code cost identifying a total cost to modernize the number of common code components for the applications.

12. The computer system of claim 8, wherein the number of processor units executes program instructions to:
determine an application specific effort to modernize the applications having the number of common code components as follows:

ASE=(total cost to modernize an application without a cost savings)−(a common code effort for the number of common code components used by the application).

13. The computer system of claim 8, wherein the number of processor units executes program instructions to:
determine an efficiency improvement identifying the cost saving to modernize an application having the number of common code components as follows:

EI=(total cost to modernize the application−a common code effort for the number of common code components)/(total cost to modernize the application).

14. The computer system of claim 8, wherein the number of common code components is selected from at least one of a Java Archive file, a library, a collection of subroutines, a collection of procedures, a collection of scripts, or classes.

15. A computer program product for modernizing applications, the computer program product comprising:
a computer readable storage medium having program instructions embodied therewith, the program instructions executable by a computer system to cause the computer system to perform a method of:
analyzing, by a number of processor units, each application in the applications in isolation from other applications to identify issues in code for the applications and a number of common code components;
creating, by the number of processor units, a directed graph structure using the issues identified in the applications and the number of common code components, wherein the directed graph structure includes relationships between the applications, the number of common code components, and the issues identified;
determining, by the number of processor units, a common code component modernization cost for the number of common code components using the directed graph structure; and
determining, by the number of processor units, an application modernization cost for a set of the applications using the directed graph structure, wherein the application modernization cost for the set of the applications takes into account the common code component cost for modernizing the number of common code components.

16. The computer program product of claim 15 further comprising:
identifying, by the number of processor units, a set of common code resolutions for at least one of the applications or the number of common code components;
wherein determining the application modernization cost for the set of the applications using the directed graph structure comprises:
determining the application modernization cost for the set of the applications using the directed graph structure taking into account a cost savings resulting from resolving the issues in the number of common code components and the set of code resolutions for a set of issues for at least one of the applications or code components.

17. The computer program product of claim 15 further comprising:
determining, by the number of processor units, a code efficiency score as follows:

CES=(cost of resolving an issue for a common code component in isolation)*(a number of the applications using the common code component−1).

18. Computer program product of claim 15 further comprising:
determining, by the number of processor units, a cumulative common code cost identifying a total cost to modernize the number of common code components for the applications.

19. The computer program product of claim 15 further comprising:
determining, by the number of processor units, an application specific effort to modernize the applications having the number of common code components as follows:

ASE=(total cost to modernize an application without a cost savings)−(a common code effort for the number of common code components used by the application).

20. The computer program product of claim 15 further comprising:
    determining, by the number of processor units, an efficiency improvement identifying the cost saving to modernize an application having the number of common code components as follows:

EI=(total cost to modernize the application−a common code effort for the number of common code components)/(total cost to modernize the application).

\* \* \* \* \*